No. 802,323. PATENTED OCT. 17, 1905.
F. H. ROEWE.
HOISTING JACK.
APPLICATION FILED JUNE 27, 1905.
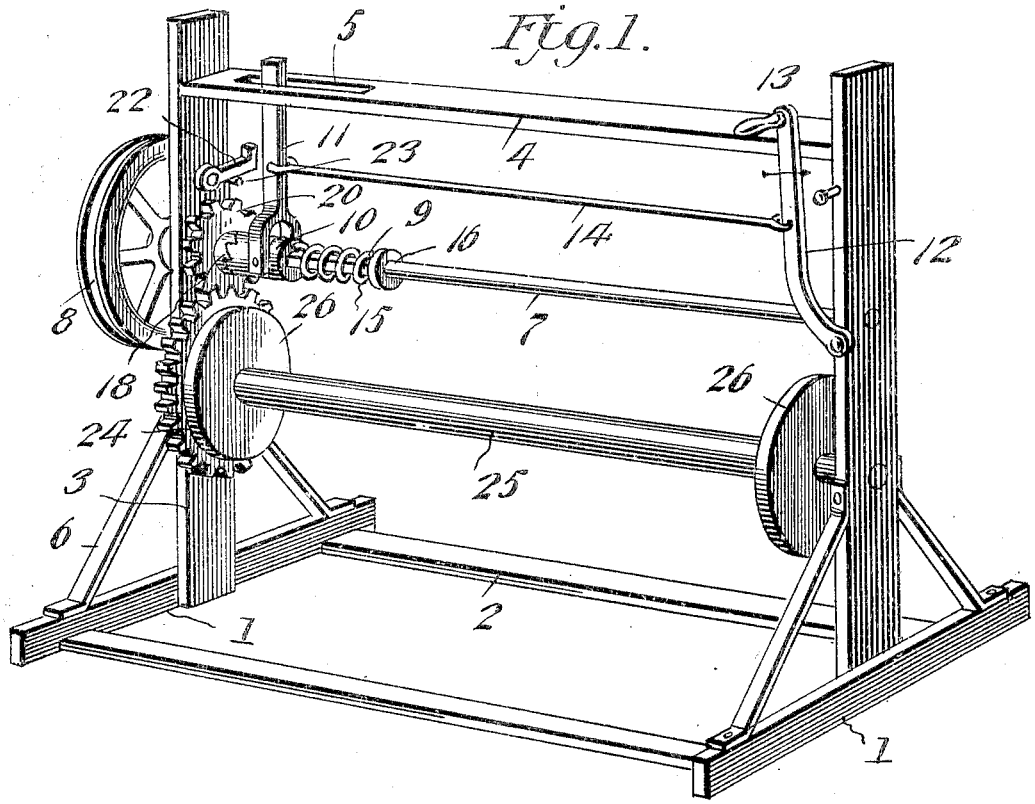
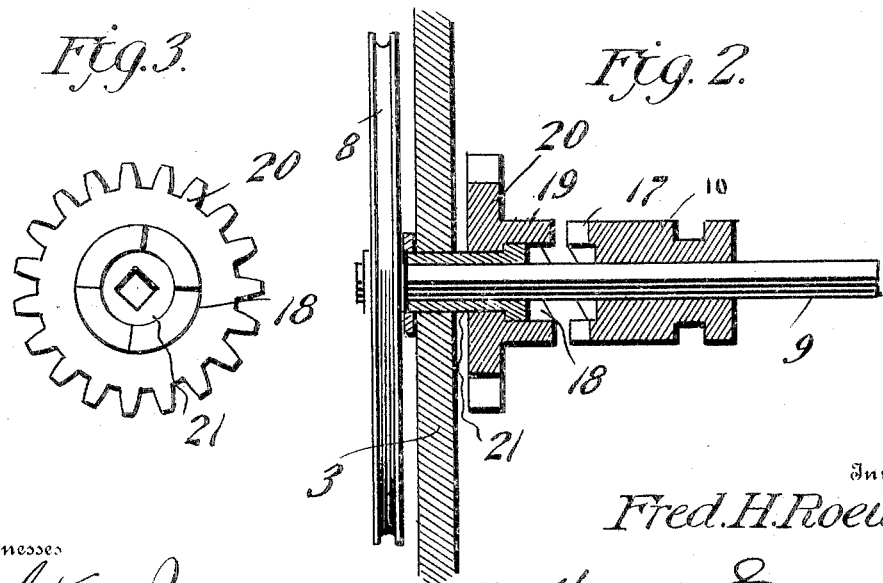
Witnesses
Geo Ackman Jr.
F. S. Elmor
Inventor
Fred. H. Roewe,
By Victor J. Evans
Attorney

UNITED STATES PATENT OFFICE.

FRED H. ROEWE, OF FENNIMORE, WISCONSIN.

HOISTING-JACK.

No. 802,323. Specification of Letters Patent. Patented Oct. 17, 1905.

Application filed June 27, 1905. Serial No. 267,264.

*To all whom it may concern:*

Be it known that I, FRED H. ROEWE, a citizen of the United States of America, residing at Fennimore, in the county of Grant and State of Wisconsin, have invented new and useful Improvements in Hoisting-Jacks, of which the following is a specification.

This invention relates to hoisting-jacks designed especially for unloading hay or the like, and has for its objects to produce a comparatively simple inexpensive device of this character which may be readily transported, one in which the hoisting-drum will be under thorough control of the operator and may be started or stopped at will, one in which the clutch member for controlling the drum may be readily actuated, and one wherein the drum-operating mechanism may be locked against movement when desired.

With these and other objects in view the invention comprises the novel features of construction and combination of parts more fully hereinafter described.

In the accompanying drawings, Figure 1 is a perspective view of a device embodying the invention. Fig. 2 is a detail view, partly in section and on an enlarged scale, of the clutch members and adjacent parts. Fig. 3 is a face view of the driving-gear.

Referring to the drawings, it will be seen that the frame of the device comprises end beams or sills 1, connected by parallel side bars 2 and sustaining vertical uprights or standards 3, attached at their lower ends to the sills and connected adjacent their upper ends by a horizontal member or bar 4, provided adjacent one end with a longitudinal opening or slot 5, there being attached to the beams 1 and uprights diagonal brace members or struts 6 for strengthening the parts.

Journaled for rotation in the frame and having bearing in the uprights 3 is a drive-shaft 7, to one end of which is fixed a peripherally-grooved belt-pulley 8, said shaft having a square or other non-circular portion 9, on which is slidably disposed a clutch member or sleeve 10, pivoted in the bifurcated end of a lever 11, the upper end of which is disposed in the guide-slot 5, while pivoted to the upright 3 farthest removed from said lever is a controlling-lever 12, equipped at its free end with a handle 13 and connected to the member 11 by a rod or other rigid element 14.

The clutch member 10, which is normally pressed to engaging position by an expanded spring 15, having bearing at one end against a collar or abutment 16, fixed on the shaft 7, is provided with engaging portions or teeth 17, designed to interlock with corresponding teeth 18, formed upon the tubular hub 19 of a spur-gear 20, fixed upon a tubular bushing 21, having a squared opening to receive portion 9 of the shaft, whereby the bushing and gear will rotate in unison with the latter, there being pivoted to the adjacent standard 3 a latching member or dog 22, adapted for engagement with the teeth of gear 20, for a purpose which will presently appear, and normally sustained when in non-engaging position by a pin or support 23.

The gear 20 meshes with a companion gear 24, fixed upon the shaft of a winding-drum 25, journaled for rotation in the frame and having spaced heads 26.

In practice, supposing the parts to be in their normal position, as illustrated in Fig. 1, motion is imparted to shaft 7 by means of a belt or table (not shown) arranged for travel on the pulley 8 and is thus transmitted through the medium of gears 20 and 24 to the hoisting-drum 25. During the operation of the device, after the load has been properly hoisted by the drum, the latter may be released to permit descent of the load onto a wagon or stack by moving the controlling-lever 12 in the direction indicated by the arrow in Fig. 1, thus moving clutch member 10 against the action of spring 15 and releasing gear 20, which may then revolve freely upon the bearing-sleeve 21, as will be readily understood. Should it be desired at any time to arrest the movement of the parts for holding the load at an elevation, the dog 22 is thrown into engagement with the teeth of gear 20, thus checking the rotation of the latter, and consequently that of the drum, through the interengagement of the gears 20 and 24.

From the foregoing it is apparent that I produce a simple device admirably adapted for the attainment of the ends in view and one in which the hoisting mechanism will be under thorough control of the operator, it being understood that in attaining these ends minor changes in the details herein set forth may be resorted to without departing from the spirit of the invention.

Having thus described the invention, what is claimed is—

1. In a device of the class described, a frame, a drum rotatively sustained thereby, a gear fixed upon the drum, a drive-shaft journaled in the frame, a gear idly mounted thereon in mesh with the first-named gear, a clutch member fixed upon the shaft, a spring for maintaining the clutch normally in engagement with the idle gear, a member comprised in the frame and provided with a guide-slot, an arm attached to the clutch and entered for movement in said guide-slot, and an operating-lever connected with the arm for actuating the clutch.

2. In a device of the class described, a frame, a drum rotatively sustained thereby, a gear fixed upon the drum, a drive-shaft having a non-circular portion, a clutch member slidable upon said portion for rotation with the shaft, a pinion idly mounted upon the shaft in mesh with the gear, a spring for maintaining the clutch normally in engagement with the pinion, a frame member having a guide-opening, an arm movable in said opening and operatively engaged with the clutch and an operating-lever connected with the arm for actuating the clutch.

In testimony whereof I affix my signature in presence of two witnesses.

FRED H. ROEWE.

Witnesses:
CHAS. P. HINN,
H. B. LEWIS.